United States Patent [19]

Harper

[11] Patent Number: 4,569,252

[45] Date of Patent: Feb. 11, 1986

[54] CHANGE GEAR PLANETARY TRANSMISSION

[75] Inventor: Joseph F. B. Harper, Sale, England

[73] Assignee: Eaton Corporation, Cleveland, Ohio

[21] Appl. No.: 552,539

[22] Filed: Nov. 16, 1983

[30] Foreign Application Priority Data

May 19, 1983 [GB] United Kingdom ............... 8313910

[51] Int. Cl.[4] .................... F16H 3/70; F16H 57/10
[52] U.S. Cl. .................................. 74/785; 74/750 R
[58] Field of Search ................... 74/785, 788, 750 R

[56] References Cited

U.S. PATENT DOCUMENTS

| | | | |
|---|---|---|---|
| 1,463,447 | 7/1923 | Stahl | 74/785 |
| 1,598,586 | 8/1926 | Lanquetin | 74/785 |
| 2,331,684 | 10/1943 | Henningsen | 74/785 |
| 2,598,179 | 5/1952 | Kelbel | 74/788 X |
| 3,365,985 | 1/1968 | Johnson | 74/785 X |
| 3,772,940 | 11/1973 | Ohtsuka et al. | 74/785 |
| 4,063,470 | 12/1977 | Kelbel | 74/785 |
| 4,074,591 | 2/1978 | Dick | 74/785 |
| 4,103,753 | 8/1978 | Holdeman | 74/785 X |
| 4,189,960 | 2/1980 | Holdeman | 74/750 R X |
| 4,347,762 | 9/1982 | Holdeman | 74/785 X |

FOREIGN PATENT DOCUMENTS

| | | | |
|---|---|---|---|
| 508846 | 10/1930 | Fed. Rep. of Germany | 74/785 |
| 17606 | of 1910 | United Kingdom | 74/785 |
| 1358898 | 7/1974 | United Kingdom . | |
| 2102515 | 2/1983 | United Kingdom | 74/785 |
| 914843 | 3/1982 | U.S.S.R. | 74/785 |

Primary Examiner—William F. Pate, III
Assistant Examiner—Dwight G. Diehl
Attorney, Agent, or Firm—C. H. Grace; H. D. Gordon

[57] ABSTRACT

An improved change speed planetary transmission (100) of the type utilizing planetary gearing (102) to drivingly connect an input shaft (12) to an output shaft (14) is provided. The planetary gearing includes a sun gear (104) fixed for rotation with the input shaft, planet gears (110) constantly meshed with the sun gear and rotationally supported on planet gear shafts (114) carried by a planet carrier (116) fixed for rotation with the output shaft and a ring gear (120) constantly meshed with the planet gears. The ring gear is selectively axially moveable relative to the transmission housing (18) and the sun gear and planet gears to a first position for positive engagement with a clutch member (134) fixed for rotation with the housing to provide an indirect ratio mode of operation and to a second axial position for positive engagement with a clutch member (126) fixed to the sun gear to provide a direct ratio mode of operation. In the direct ratio mode of operation of the transmission, the forces ($2F_1$) tending to cause brinelling of the planet gear support surfaces of the planet gear shafts are considerably reduced relative to corresponding forces ($2F_2$) in the prior art designs (10).

2 Claims, 6 Drawing Figures

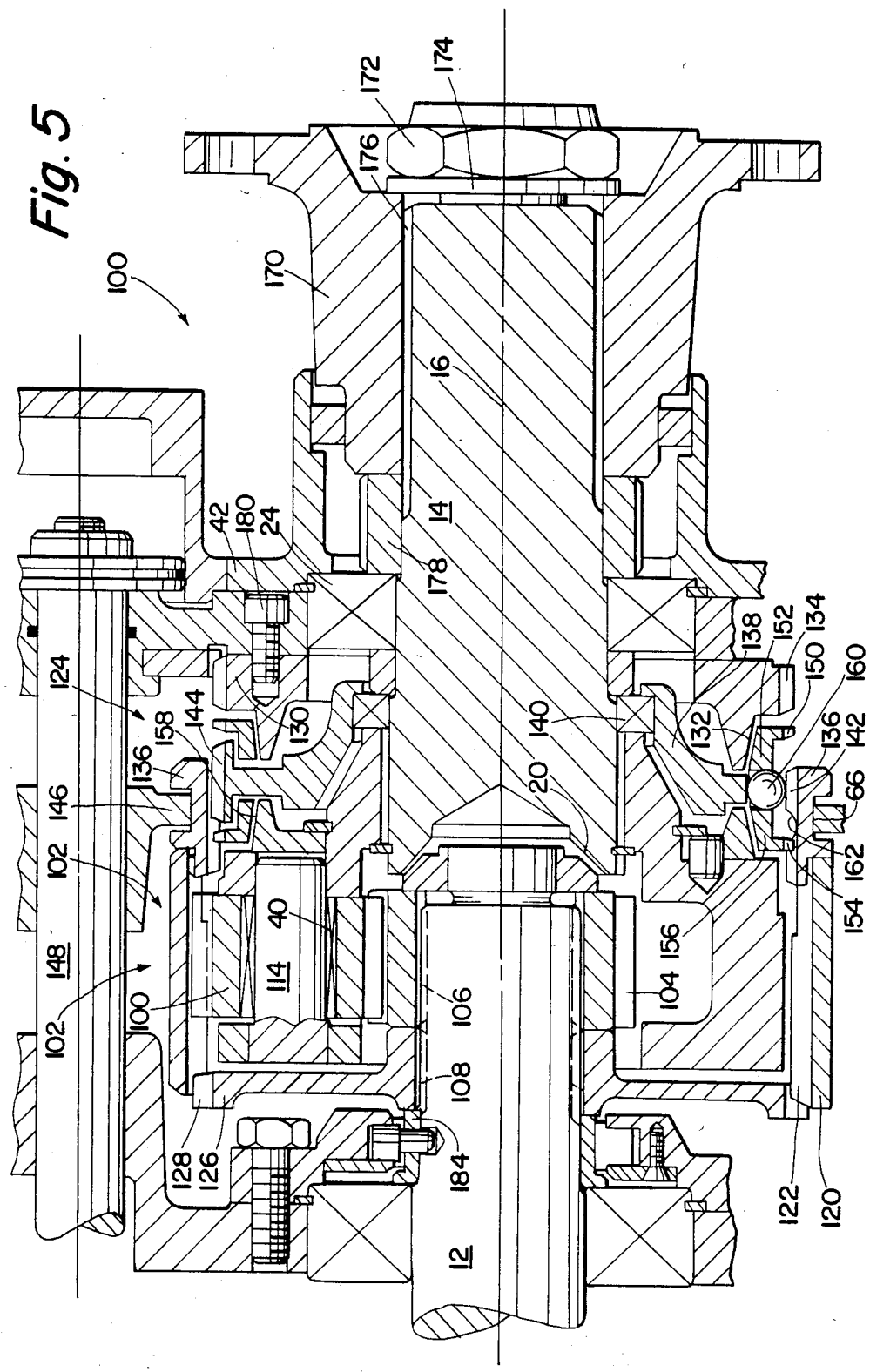

INDIRECT DRIVE MODE $R_P = \dfrac{R_R - R_S}{2} + R_S = \dfrac{R_R + R_S}{2}$ $T_1 = F_2 R_S$ $F_2 = T_1/R_S$ $T_2 = F_2 R_R$ $T_0 = 2F_2 R_P$ $T_0 = 2F_2 (R_R + R_S/2)$ $T_0 = F_2 (R_R + R_S)$ $F_2 = T_0 (R_R + R_S)$

CHANGE GEAR PLANETARY TRANSMISSION

FIELD OF THE INVENTION

The present invention relates to a change gear planetary transmission, also referred to as an epicyclic transmission. More particularly, the present invention relates to a change gear planetary transmission having an input and an output shaft in substantially coaxial and adjacent end-to-end relationship and selectively shiftable between an indirect ratio (i.e. a ratio wherein the output shaft is driven at a different speed, usually a reduced speed, than the input shaft speed) and a direct ratio (i.e. a ratio wherein the output shaft is driven at the same rotational speed as the input shaft). The sun gear rotates with the input shaft, the carrier of the multiple planet gears rotates with the output shaft and the indirect ratio is obtained by rotationally fixing the ring gear or annulus to the transmission housing or another member rotatable relative to the input and output shafts.

DESCRIPTION OF THE PRIOR ART

Planetary or epicyclic change gear transmissions of the type utilizing single, multiple and/or compound planetary gearing systems comprising a central or sun gear meshingly engaged with multiple planet gears carried by a planet carrier which planet gears are in turn meshed with an annulus or ring gear are well known in the prior art and examples thereof may be seen by reference to U.S. Pat. Nos. 2,598,179; 3,365,985; 3,772,940; 4,103,753; 4,189,960; and 4,347,762, the disclosures of all of which are hereby incorporated by reference. In such transmissions, one of the planetary elements is typically fixed to rotate with an input member, another of the elements is typically fixed to rotate with an output member and a third element is selectively clutched, either by positive clutch or friction clutch means, to a casing or the like to obtain an indirect ratio or to one of the other elements to obtain a direct ratio.

Two speed planetary change gear transmissions having a direct ratio and an indirect ratio are well known in the prior art. Such transmissions may act independently to provide a selected one of two drive ratios between an input and an output member, such as when utilized as a wheel end hub drive, or may be utilized in series connection with a multi-speed change gear transmission section as the range or splitter section of a multi-speed compound transmission. The planetary change gear transmission of the present invention is especially well suited for, but not necessarily limited to, use in cooperation with an ordinary multi-speed change gear transmission section as the splitter or range auxiliary section therefor.

In the prior art embodiments of two speed change gear planetary transmission of the type having the sun gear fixed for rotation with the input shaft and the planet carrier fixed for rotation with the output shaft, the conventional arrangement is to engage direct drive by locking the ring gear directly to the output shaft (or the planet carrier, if practical). It is understood, of course, that by locking any two of the three transmission elements (i.e. the sun gear, planet carrier and ring gear) for joint rotation the entire planetary system will rotate as a unit. This arrangement has the disadvantage that, as a practical and a theoretical investigation shows, the planet gear bearings in the planet carrier are subjected to high loads, both in the indirect mode when the planet gears are rotating, and in the direct mode when the planet gears are stationary on their own axes. These bearings are typically needle roller bearings. The transmission or gear train, especially when utilized as a transmission for a vehicle such as a heavy over-the-road truck, may often be in the direct mode or drive ratio for at least 80% of the time. The geartooth forces are transferred, in the direct mode, by the planet spindle needle roller bearings while they are not rolling. High loads in the direct ratio can cause the static rollers to give rise to brinelling of the needle bearing raceway. For this and other reasons, it is desired to reduce the torque load, for given output torque, exerted on the planetary carrier and its components in the direct drive mode of operation of the change gear planetary transmission.

SUMMARY OF THE INVENTION

In accordance with the present invention, the drawbacks of the prior art have been minimized by the provision of a two speed change gear planetary transmission having a selectable direct and indirect ratio of a structure which reduces the loads on the transmission components considerably, leading to better durability and/or the possibility of using smaller less expensive planet wheel bearings and other planetary components of structures. The change gear planetary transmission of the present invention also allows reduction of costs and physical length of the transmission and allows the transmission housing or casing to be simplified since an intermediate plate to support a synchronizing clutch structure for the direct drive mode of operation is not required.

The degree of beneficial reductions of loads and forces obtained by the structure of the present invention depends, of course, upon the specific ratio of the planetary transmission, which ratio is typically in the range of 3.5:1 overall. Such a ratio requires a ring gear with a pitch circle radius (PCR) 2.5 times that of the sun gear. In this case, if the tooth force in the present invention is designated by $F_1$ and that for the prior art arrangement is $F_2$ then the beneficial reduction may be expressed:

$F_1/F_2 = $ PCR sun gear/(PCR sun gear and PCR ring gear)

$F_1/F_2 = 1/(1 + 2.5)$ $F_1/F_2 = 1/3.5$ $F_1 = F_2/3.5$

Accordingly, reductions of forces in the range of 3.5 are obtainable relative to the prior art structures.

The above is accomplished by providing a two speed change gear planetary transmission wherein the ring gear is not coupled to the output shaft for the direct drive mode of operation. Instead, the ring gear or annulus is engaged to rotate rigidly with the input shaft whenever direct drive is needed. The ring gear, according to an important aspect of the present invention, is axially slideable relative to the planet gears while remaining in the usual constant engagement therewith so as to engage and lock to an externally toothed wheel or clutch plate rotating with the sun gear and the input shaft. The ring gear or annulus will preferably, but not necessarily, employ the same internal gear teeth that engage the planet gears for the inventive lockup to the input shaft, thus causing a one-to-one or direct drive mode of operation. For synchronizing preparatory to engagement, it is preferable to synchronize to the output side, or particularly to the rigid piece or web coupling the planet carrier to the output shaft.

Accordingly, the change gear planetary transmission of the present invention comprises a clutch member carrying external clutch teeth or splines fixed for rotation with the input shaft and sun gear, an annulus or ring gear constantly meshed or engaged with a set of planet gears and axially slideable between two axial positions for engaging and not engaging, respectively said externally toothed clutch member, and a synchronizer operative to frictionally couple the ring gear respectively to the planet carrier (or to the output shaft, or to the coupling member connecting the planet carrier to the output shaft) and to the relatively fixed casing or another member rotatable relative to the input and output shafts.

In operation, the ring gear or annulus of the planetary of epicyclic gear transmission is fixed for axial movement with a bi-directional clutch sleeve engageable by conventional shifting means such as shift forks, yokes or the like. The annulus or ring gear may be joined to the synchronizer clutch sleeve by means of electron welding or the like. When the annulus is moved toward the direct drive clutch member fixed to the input shaft, the synchronizer clutch accellerates the ring gear and synchronizer sleeve until their speed is substantially synchronous with that of the planet carrier. At that time, the planet gears become stationary on their own axes and hence the sun gear and input shaft are forced to rotate at the same speed as the planet carrier and the ring gear. It is then possible for the ring gear to move into positive engagements with the teeth of the clutch ring fitted to the input shaft. When the ring gear is moved to the other operational position thereof, i.e. the indirect mode of operation position wherein the ring gear is fixed to the transmission housing, the synchronizer will retard the rotational movement of the ring gear relative to the transmission housing allowing the ring gear to positively engage a second, indirect ratio clutch member fixed to the housing.

Accordingly, it is an object of the present invention to provide a new and improved change gear planetary transmission of the type having a direct and an indirect mode of operation.

Another object of the present invention is to provide a new and improved change gear planetary transmission of the type having a sun gear fixed for rotation with the input shaft and a planetary carrier fixed for rotation with the output shaft, wherein the forces exerted upon the planet gears in the direct mode of operation of transmission are minimized.

A further object of the present invention is to provide a new and improved two speed change gear planetary transmission of the type having a direct and an indirect mode of operation wherein the sun gear is fixed for rotation with the input shaft, the planet carrier is fixed for rotation with the output shaft, and the ring gear is selectively axially moveable relative to the sun gear and the planet carrier to positively engage, one at a time, a clutch member fixed for rotation with the input shaft and a clutch member fixed to the transmission housing.

These and other objects and advantages of the present invention will become apparent from a reading of the following description of the preferred embodiment taken in connection with the accompanied drawings.

BRIEF DESCRIPTION OF THE DRAWINGS

FIG. 5 is a partial view, in section, illustrating the detailed structure of the transmission schematically illustrated in FIG. 3.

DESCRIPTION OF THE PREFERRED EMBODIMENT

Figure 1:
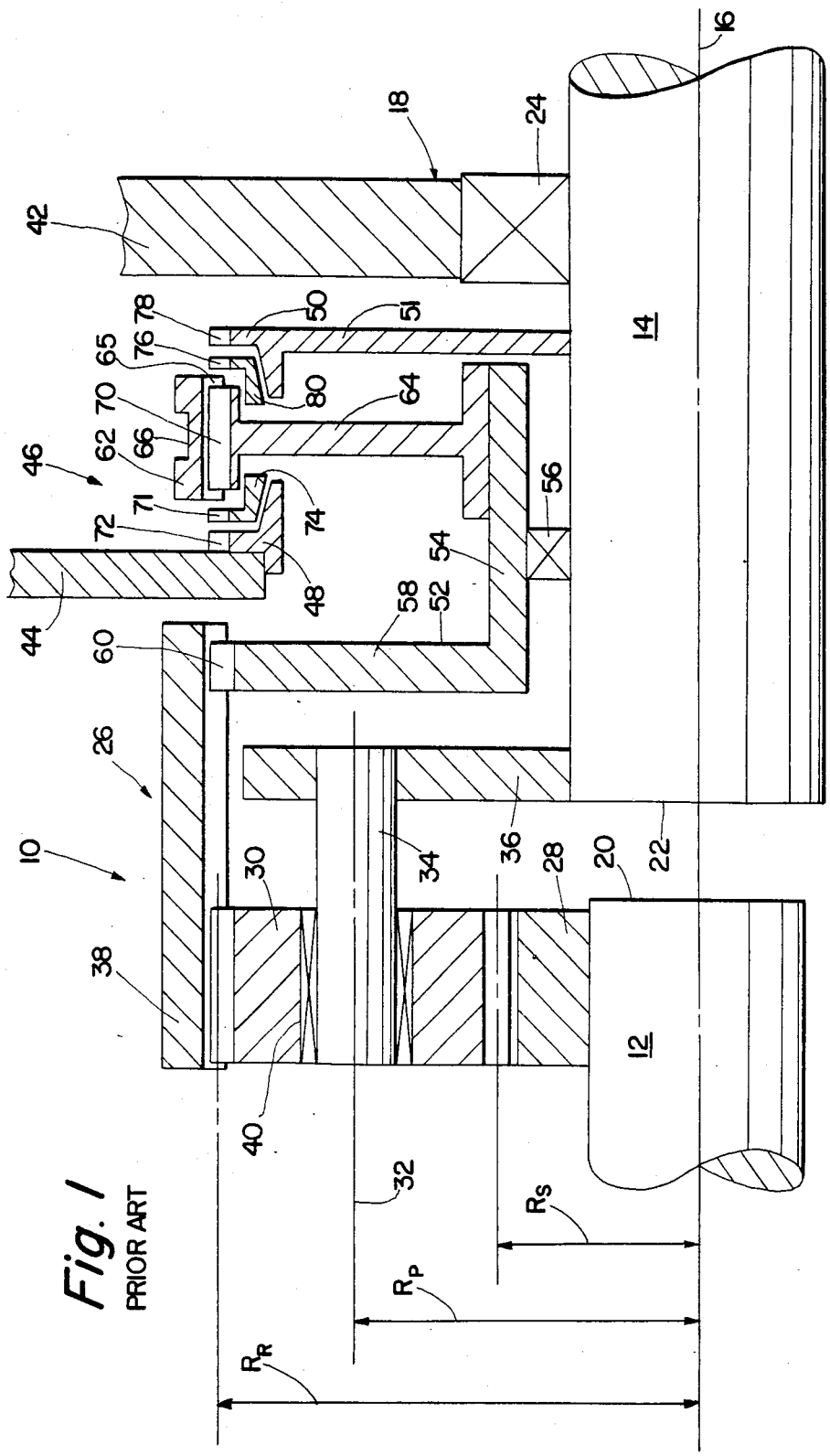
FIG. 1 is a partial view, in section, schematically illustrating a typical prior art two-speed shiftable planetary transmission.

In the following description of both the prior art and the preferred embodiment, certain terms will be used for purposes of reference and ease of understanding only and are not intended to be limiting. The terms "upward", "downward", "rightward" and "leftward" will refer to directions in the drawing to which reference is made. The terms "forward" and "rearward" will refer respectfully to the front and rear ends of the transmission mechanisms as sames are conventionally mounted in a vehicle. The words "inwardly" and "outwardly" will refer to directions toward and away from, respectively, the geometric center of the device and/or designated parts thereof. Said terminology will include the words above specifically mentioned, derivatives thereof and words of similar import.

Both the prior art two-speed change gear planetary transmission and the two-speed change gear planetary transmission of the present invention are illustrated, and are particularly well suited as, auxiliary transmission sections of compound transmissions wherein the auxiliary sections are connected in series with the main transmission sections as well known in the Prior Art. However, it is understood that the change speed planetary transmission of the present invention is not limited to such applications. Both the prior art and the present invention are illustrated as transmissions having a speed reduction ratio and a direct drive ratio wherein the sun gear is fixed for rotation with the input shaft and the planet carrier is fixed for rotation with the output shaft. It is understood, however, that the present invention is also suited for those types of gear drives wherein the planet carrier is fixed to the input shaft and the sun gear fixed for rotation with the output shaft.

Figure 2:
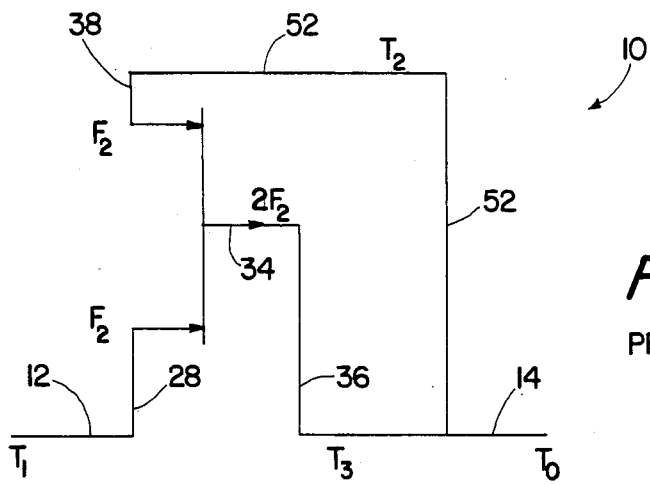
FIG. 2 shows a force diagram and the calculations therefor the direct drive mode of the prior art planetary transmission of FIG. 1.

The structure of a typical prior art two-speed change gear planetary transmission 10 and the direct drive force diagram therefor may be seen by reference to FIGS. 1 and 2. Transmission 10 includes an input shaft 12 and an output shaft 14, both independently rotatable about an axis of rotation 16 relative to a transmission housing or casing 18. The inner ends 20 and 22 of the shafts 12 and 14, respectively, are arranged in near or abutting end-to end relationship. Output shaft 14 is supported for rotation within housing 18 by means of several bearings, only one of which, 24, is illustrated. Typically, input shaft 12 of planetary change gear transmission 10 is integral with or driven by the output shaft (not shown) of a conventional change speed main transmission section (not shown).

Input shaft 12 is drivingly connected to the output shaft 14 by means of planetary change speed gearing 26. The planetary gearing 26 comprises a sun gear 28 fixed for rotation with input shaft 12 and carrying external gear teeth defining a pitch radius $R_S$, a plurality, usually three of more (only one of which is shown in FIG. 1), of planet gears 30 constantly meshed with sun gear 28 and supported for rotation about their axes 32 on planet shafts 34 which planet shafts 34 are supported on a disc type planet carrier 36 fixed for rotation with the output shaft 22 and an internally tooth annulus or ring gear 38 the teeth of which are constantly meshed with the teeth of the planet gears 30 and which internal teeth define a pitch circle radius $R_R$. The axes of the planet shafts 34 define a radius $R_P$ from the axis of rotation 16 of shafts 12 and 14. Typically, gears 28, 30 and 38 are axially fixed relative to the shafts 12 and 14 and the housing 18 by conventional means (not shown) and the planet gears 30 are supported for rotation about the planet shafts 34 by needle roller bearings 40.

As is well known and understood for planetary transmissions of the type illustrated, rotation of the input shaft 12 and sun gear 28 carried thereby will result in rotation of the planet shafts 34 and planet carrier 36 about the axis of rotation 16 to drive the output shaft 12. As is also well known for planetary transmissions, locking of any two of the three elements (ring, planet and sun gear elements) for joint rotation will cause the entire planetary system to rotate as a unit. Accordingly, fixing of the ring gear 38 to either the input shaft 12 or the output shaft 14 will result in the input shaft and output shaft rotating at the same rotational speed and this is the direct ratio mode of operation of the change speed transmission 10. Conversely, fixing the ring gear 38 to the transmission housing 18, portions 42 and 44 of which are illustrated in FIG. 1, will result in the planet gears 30 rotating within the internally tooth ring gear 38, also known as "walking around", resulting in the planet shafts 34 and planet carrier 36 rotating the output shaft 14 at a reduced speed relative to input shaft 12 in response to rotation to input shaft 12. This is the indirect or reduced speed ratio mode of operation of transmission 10.

It is also well known that the indirect mode of operation may be obtained by locking the ring gear to a member rotatable relative to the input and output shafts. Typically, such a member is rotated at a speed different from the rotational speed of the input shaft.

Shifting of transmission 10 between its indirect ratio mode and its direct ratio mode is accomplished by rotationally fixing ring gear 38 to transmission housing 18 or to output shaft 14, respectfully, by means of a shifting mechanism indicatd generally at 46. Shifting mechanism 46 includes an indirect ratio positive clutch and synchronizing cone structure 48 fixed to housing portion 44 and a direct ratio positive clutch and synchronizing cone structure 50 fixed for rotation with the output shaft 14 by means of a ring or disc-like coupling member 51. A ring gear coupling or connecting member 52 is rotationally supported at an axially extending generally tubular portion 54 on output shaft 14 by means of bearings 56 and includes a radially extending portion 58 by which the ring gear 38 is rotationally and axially fixed thereto as at mating splines 60. Bearing 56 may also provide some mounting support for rotation of the ring gear 38.

A bi-directional sliding clutch member 62 is rotationally supported on a radial web member 64 fixed to the axially extending tubular portion 54 of the ring gear connecting member 52. Accordingly, sliding clutch member 62 is fixed for rotation with the ring gear 38. Sliding clutch member 62 is provided with a groove 66 for receipt of a shifting means such as a well known shift fork or yoke (not shown). The sliding clutch member 62 is provided with internal clutch teeth or splines 68 for cooperatin with external splines 70 on the web member 64 and for further cooperation with the external clutch teeth 71 and 72 of the synchro cone 74 and indirect clutch member 48. The internal clutch teeth 68 will also cooperate with clutch teeth 76 and 78 of the synchro cone 80 and direct clutch 50, respectively. Accordingly, sliding clutch 66 may be moved axially to the left to positively engage indirect clutch 48 to rotationally fix the ring gear 38 to the housing 18 or may be moved axially to the right to positively engage direct clutch 50 to rotationally fix ring gear 38 to the output shaft 14.

In operation, when sliding clutch member 66 is moved leftwardly from the position shown the indirect synchro cone 74 is engaged and pressed against the cone surface of the indirect clutch 48 to frictionally decelerate clutch member 66 and all structure rotating therewith to a rotational halt relative to the housing 18 allowing the clutch teeth 68 and 72 to be engaged in a synchronous manner as is known in the art to selectively shift the transmission 10 to the indirect ratio mode operation thereof. Rightward axial movement of sliding clutch member 66 from the position shown will cause engagement of the synchro clutch cone 80 with the conical surface of direct clutch member 50 and all structure rotating therewith to be accelerated and/or the output shaft to be decelerated, to a synchronous rotation allowing engagement of clutch teeth 68 and 78 to accomplish synchronous engagement of the direct ratio mode of transmission 10.

In the direct ratio mode of operation, that is when sliding clutch member 66 is positively engaged with direct ratio clutch 50 and the output shaft 14, the sun gear 28, the planet carrier 36, the ring gear 38, the connecting member 52 and the output shaft 14 are all rotating at the same speed and the input torque is transmitted to the planet shafts 34 via the planet gears 30 which are rotationally fixed on the rotational axes 32. In this mode of torque transmittal the fixed needle roller bearings 40 each tend to press against one portion of the planet shafts 34, usually a bearing race, and to brinel it. Moreover, as a reaction to rotation of the input shaft 12 in a given direction of rotation, the ring gear 38 is caused by the reaction forces to be urged to rotate in the opposite direction of rotation which tendency is affectively prevented by the coupling member 52 which is fixed for rotation of the output shaft 14. This mode of operation is schematically and algebraically illustrated in FIG. 2. The input torque $T_1$ applied to the input shaft 12 becomes the output torque $T_0$ applied to that portion of the output shaft 14 to the right of the connection with web member 51. Output shaft 14 has a higher torque $T_3$ applied thereto to the left of the junction of web member 51 and all this is supplied by the forces $2F_2$ through the various planet shafts 34. $T_3$ exceeds $T_0$ by the torque $T_2$ which is applied via member 52 to the ring 38.

In direct drive, $T_0$ equals $T_1$. Hence, the algebraic derivations shown in FIG. 2. The forces on the planet cage, $2_F$ (the total planet wheel peripherial forces) are given by the output torque $T_0$ divided by $R_S$ (the sun wheel radius). We can regard $T_O$ and $R_S$ as fixed for understanding the problem and the solution thereto. The problem, or object of the present invention, is to reduce $2F_2$, which is a measure of the brinelling effect of the needle rollers on the raceway of planet shafts 34 when the rollers are static during direct drive.

Figure 4:
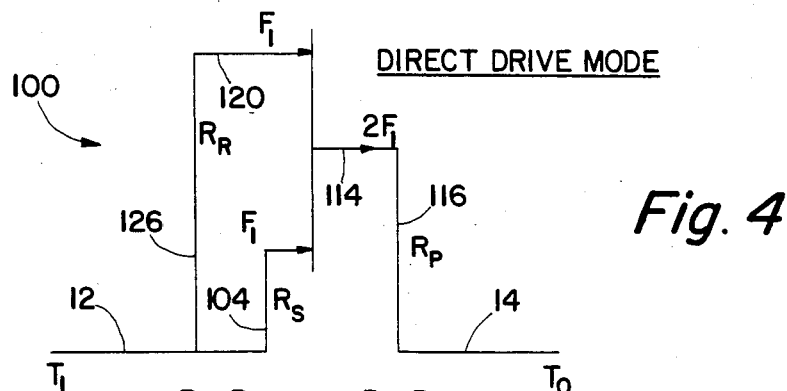
FIG. 4 is a force diagram and the calculations therefor for the direct drive mode of the transmission of the present invention as seen in FIG. 3.
Figure 3:
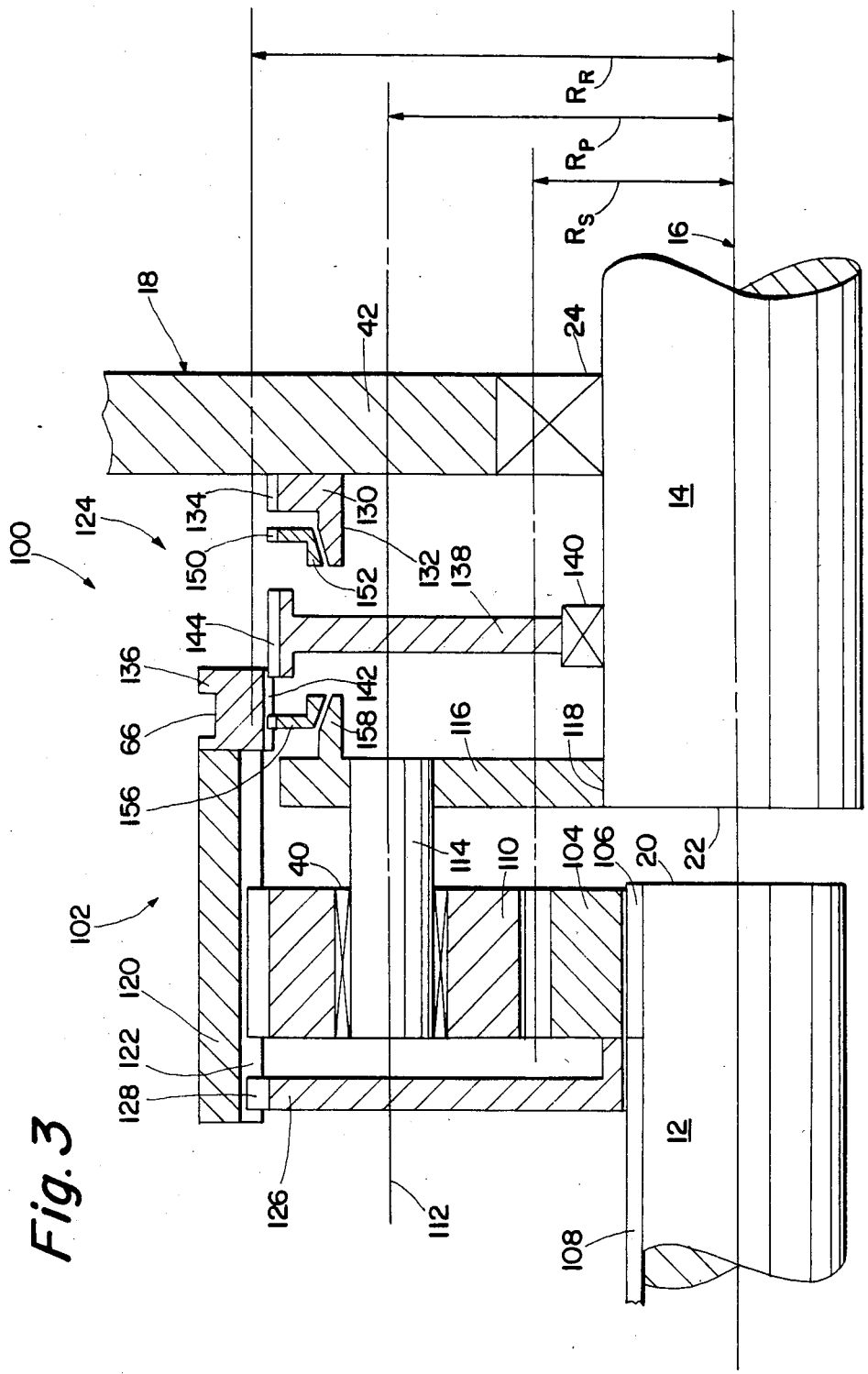
FIG. 3 is a partial view, in section, schematically illustrating the two-speed, change gear planetary transmission of the present invention.

The preferred embodiment of the two speed change gear planetary transmission 100 of the present invention may be better appreciated by reference to FIGS. 3-5. Change speed planetary transmission 100 is schematically illustrated in FIG. 3 and structurally illustrated in FIG. 5. Planetary change speed transmission 100 includes an input shaft 12 arranged coaxially with an output shaft 14 for independent rotation about an axis of rotation 16 relative to a transmission housing or casing 18 a portion of which, 42 is illustrated. Output shaft 14 is supported for rotation in housing 18 be means of bearing 24. The inner ends 20 and 22 of shafts 12 and 14, respectively, are arranged in close or axially abutting relationship. It is understood, as is well known in the art, that one of the shaft ends 20 or 22 may be provided with a necked down portion to be received within a pocket provided in the adjacent end of the other shaft.

Input shaft 12 is drivingly connected to the output shaft 14 by means of change speed planetary gearing indicated generally at 102. Planetary gearing 102 includes a sun gear 104 fixed for rotation to input shaft 12 as at internal splines 106 mating with external splines 108 provided on the input shaft 12. The sun gear 104 carries external gear teeth defining a pitch radius $R_S$ constantly meshed with the gear teeth of a plurality (only one of which is shown) of planet gears 110. The planet gears 110 are supported for rotation about their axes 112 on planet shafts 114 by means of needle roller bearings 40. The planet shafts 114 are carried by a disc or platelike planetary carrier 116 for rotation about axis of rotation 16 at a radius $R_P$. Planet carrier 116 and the planet shafts 114 are fixed for rotation about axis 16 with the output shaft 14 as at the splined connection 118. The sun gear 104 and the planet gears 110 are axially fixed relative to the housing 18 and the shafts 12 and 14 by conventional means. The planet gears 110 are constantly meshed with an annulus or ring gear 120 provided with an annular array of internal gear teeth 122. As will be described in greater detail below, ring gear 120 is axially moveable relative to the planet gears 110 but will remain in meshing engagement therewith for all axial positions thereof.

As with transmission 10 described above, change speed transmission 100 has two selectable operating modes, namely an indirect operating mode wherein the ring gear 120 is rotationally fixed to the housing 18 (or some other member rotatable relative to the input and output shafts) and a direct mode wherein ring gear 120 is rotationally fixed to either the input shaft or the output shaft 14 to lockup the planetary gearing. In the present invention, to achieve the direct drive mode of operation, the ring gear 120 is rotationally fixed to the input shaft 12, the importance of which is discussed in detail below.

Transmission 100 is selectively shifted between its two operational modes by means of a shifting mechanism indicated generally by reference numeral 124. Shifting mechanism 124 includes a radially extending disc or ring member 126 axially and rotationally fixed to the input shaft 12 and carrying direct clutch teeth 128 at the outer radially periphery thereof. Clutch teeth 128 are preferably of substantially the same profile as the gear teeth of planet gears 110 and define a pitch radius of $R_R$ relative to the axis of rotation 16 for selective engagement by the teeth 122 of ring gear 120 to rotationally fix the ring gear to the input shaft. The shifting mechanism also includes a direct clutch and synchronizing cone mechanism 130 fixed to the housing 18 and including a conical synchronizing portion 132 and clutch teeth 134. A slider member 136 is rotationally fixed to a radially extending connecting disc member 138 supported for rotation on and relative to output shaft 14 by known means such as bearing 140. Slider member 136 defines internal splines 142 which mate with external splines 144 carried by the support member 138. As will be seen, the splines 142 also serve as positive clutch teeth. The slider member 136 includes a groove 66 for engagement by a shift fork 146 fixed for axial movement with a shift rod or shift piston 148. The slide member 136 is attached to the axially moveable ring gear 120 for axial and rotational movement therewith which connection may include a spline and then electron-welded connection, a pin connection or the like.

The connecting disc member 138 may provide a degree of rotational support for the ring gear 120 in the same manner as connecting portion 58 provided a degree of rotational support for ring gear 38 in the prior art transmission 10 described above.

To achieve the indirect mode of operation, the slide member 136 and ring gear 120 are moved axially rightwardly from the position shown causing the internal spline teeth 142 of slide member 136 to engage the spline teeth 150 of indirect synchro cone 152 which will decelerate the slide member and ring gear 120 to a halt relative to housing 18 allowing the internal clutch teeth 142 to positively engage direct clutch teeth 134 of direct clutch member 130 to rotationally fix the slide member and ring gear to the housing. To select the direct drive ratio mode of operation, the slide member 136 and ring gear 120 fixed thereto is moved axially leftwardly towards the position shown in FIG. 3 and 5 causing the internal clutch teeth 142 of the slide member 135 to engage the teeth 154 of direct synchro cone 156 bringing the synchro cone into frictional contact with a conical surface 158 provided on planet carrier 116. The synchro cone 156 will accelerate the slide member 136 and ring gear 120 to match the speed of the output shaft 12, prior to permitting clutch teeth 142 to pass through clutch 156 and the internal gear teeth 122 of ring gear member 120 may be engaged with external clutch teeth 128 of ring member 126 to lock the ring gear 120 rotationally to the input shaft 12 to achieve the direct drive mode of operation of transmission 100.

Should it be desired to provide a so called neutral position wherein the torque supplied to the output shaft 14 is limited (i.e. limited to the maximum resistance to rotation of the ring gear 120 when the ring gear is not rotationally fixed to the housing nor to the sun gear or planetary carrier) a spring biased detent ball 160 may be provided in the rotational support carrier 138 and a complementary detent groove 162 provided in slide member 136 positioning the slide member 135 and ring gear 120 in a position wherein ring gear 120 is not engaged to indirect clutch member 134 nor direct clutch member 128. In such a position, if resistance to rotation of the output shaft 14 exceeds resistance to rotation of the rotationally free ring gear 120, rotation of the input shaft 12 will result in rotation of the ring gear 120 and not rotation of output shaft 14.

The support member 138 is constantly supporting slide member 136 in all axial positions thereof providing continuous rotational support for the ring gear 120. By use of the axially movement ring gear in combination with the other structure of selectively shiftable transmission 100, the need for an elongated support member such as portion 54 of support member 58 of prior art transmission 10 described above is eliminated and certain potentially damaging forces are greatly reduced as will be described in greater detail below. The structure of the synchronizing devices, 74 and 80 for transmission 10, and 152 and 156 for transmission 100, are well known in the art and any equivalent structure may be utilized therefor. By elimination of the requirement for an axially extending tubular portion 54 for the connecting member 58, the output shaft 14 may be considerably reduced in axial length for conservation of material, weight, axial space and to provide a shorter and thus less distortable output shaft. Although the use of involute shaped gear, spline and clutch teeth allowing teeth such as teeth 122 of ring gear 120 to function both as gear teeth and as clutch teeth is preferred, it is understood that gear tooth profiles and/or clutch tooth profiles may be of any conventional form.

A significant advantage of the present invention is the reduction of forces on the planet gear portion of the planetary gearing 102 in the direct drive mode of operation of transmission 100, which reduction in forces results in a reduced tendency of brinelling of the planet gear support surfaces of the planetary shafts 114. The manner in which such advantage is achieved, and the magnitude thereof, may best be appreciated by referenced to FIG. 4 which is a schematic force diagram for the transmission 100 in the direct drive mode of operation thereof and the calculations therefor taken in comparison with the similar diagram and calculations seen in FIG. 2 for the direct drive mode of operation of the prior art transmission.

The direct drive from input shaft 12 to output shaft 14 is actually via two routes. The sun gear 104 drives the locked planet gears 110 and thus their plant shafts 114 and planet carrier 116. Additionally, the lockup member 126 drives the ring gear 120 and hence also shafts 114 and planet carrier 116. The loads on the planet gear teeth at their meshing engagement with both the ring gear 120 and the sun gear 104 are $F_1$, and thus can be taken to provide a resulted load at pinion shaft 114 of $2F_1$ as $R_P$ equals the sum of $R_R$ plus $R_S$ divided by two. $2F_1$ is a measure of the tendancy or brinelling during direct drive with no relative movements at the planet shaft bearings 40. Since the output torque $T_O$ is produced by $2F_1$, at the planet wheel center which is at a distance $R_P$ from the axis of rotation 16, we can represent $T_0$ as equal to $2F_1 R_P$ which is equal to $F_1(R_S+R_R)$ Referring back to FIG. 2, the forces carried by the planet gear shaft 34 in the direct mode of operation of prior art transmission 10 may be expressed as $2F_2$ while the forces carried by the planetary gear shafts 114 in the transmission 100 of the present invention in the direct drive mode of operation thereof may be expressed as $2F_1$. As $F_2$ equals $T_I$ divided by $R_S$ and $F_1$ equals $T_I$ divided by the sum $R_P$ plus $R_S$, the advantage factor of transmission 100 relative to prior art transmission 10 may be expressed as $F_1$ divided by $F_2$ which equals $(T_1/R_R+R_S)/(T_1/R_S)$ which in turn equals $R_S/(R_R+R_S)$ which, as indicated above, is typically in the range of 3.5 to 1. Accordingly, by the use of the invention structure of transmission 100, the forces tending to cause brindelling of the planetary gear shafts has been reduced by about a factor of 3.5 to 1, the need for an elongated tubular portion of a connecting portion 54 has been eliminated and the use of an axially shorter output shaft 14 made possible.

Figure 6:
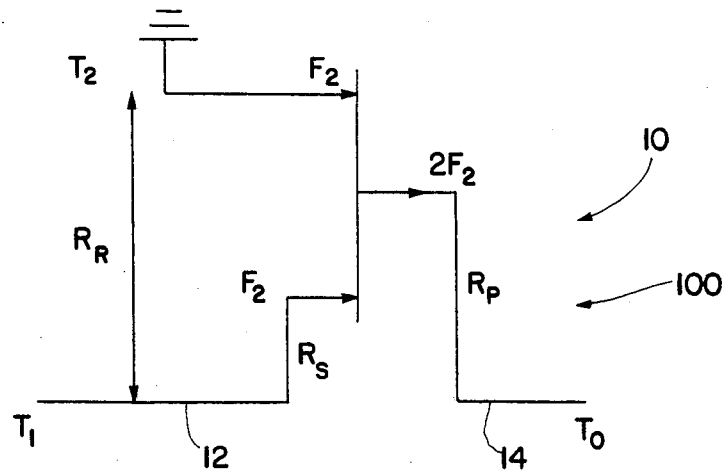
FIG. 6 is a force diagram and the calculations therefor for both the prior art transmission schematically illustrated in FIG. 1 and the transmission of the present invention schematically illustrated in FIG. 3 for the indirect drive modes thereof.

A force diagram and the calculations therefor for both the transmission 100 of the present invention and the prior art transmission 10 may be seen by reference to FIG. 6. As may be seen, the force transmitted by the planet carrier is increased by a factor equal to the reduction gearing ratio as compared to the force transmitted by the planet carrier in the direct drive mode of transmission 100 of the present invention. However, the increased forces transmitted by the planet carrier in the indirect mode versus the direct drive mode of transmission 100 is not considered to be a matter for concern as the planet gears 110 and bearings 40 supporting same on the planet gear shafts 114 are in relative rotation and thus the tendancy to cause brinelling of the planet gear shafts is greatly reduced or eliminated.

Referring again to FIG. 5, various structural details are illustrated therein which are not illustrated in the schematic illustration contained in FIG. 3, which details are not necessary for an understanding of the broad concept of the transmission 100 of the present invention. As may be seen, a mounting flange 170 may be secured to the threaded outer end of the output shaft 14 by means of a nut 172 and a lock washer 174. Mounting flange 170 is rotationally fixed to output shaft 14 as is shown. Threaded members 180 may be utilized to rotationally fix the direct drive clutch member 130 to the housing 18. A nut 182 and a spacer member 184 may be utilized to axially fix the sun gear 104 and the locking member 126 on the input shaft 12. The structural details discussed in this paragraph, and other structural details apparent from a detailed study of FIG. 5, are considered to be design features well known to those skilled in the design of plantary transmissions and form no part of the present invention.

It is an important structural feature of the present invention that the means to rotationally fix the ring gear to one of the other elements of the planetary gear system to achieve the direct drive mode of transmission 100 is locking member 126 carrying clutch teeth 128 which clutch teeth when engaged with the ring gear will rotationally lock the ring gear to the sun gear 104 and input shaft 12 and which member 126 is physically located at the input end of the transmission on the input shaft 12 and spaced axially toward to input end of the input shaft from the sun gear 104.

While the preferred embodiment of the present invention has been described with a certain degree of particularity, it is understood that such description is for illustrative purposes only and that a certain degree of modification and rearrangement of the parts is possible within the spirit and the scope of the invention as hereinafter claimed.

I claim:

1. An improved change speed planetary transmission of the type comprising a housing (18), a first shaft (12) and a second shaft (14) independently rotatable about a common axis (16) in the housing and planetary gearing (102) drivingly connecting said first shaft to said second shaft, said planetary gearing comprising a sun gear (104)

axially and rotationally fixed with said first shaft, a plurality of planet gears (110) constantly meshed with said sun gear and rotatable on planet gear shafts (114) carried by a planet carrier (116) axially and rotationally fixed with said second shaft, and a ring gear (120) constantly meshed with said planet gears, said ring gear selectively rotationally fixed by a first positive clutch connection to a member (18) independently rotatable relative to said first and second shafts to provide a first drive ratio between said first and second shaft and selectively rotationally fixed by a second positive clutch connection (122, 128, 126) to said sun gear and said first shaft to provide a direct drive ratio between said first and second shaft, said ring gear axially moveable in said housing relative to said sun gear and said planet carrier to a first position whereat said ring gear is fixed by said first positive clutch connection for rotation with said member and to a second position whereat said ring gear is fixed by said second positive clutch connection for rotation with said sun gear and first shaft and means (136) engageable by a shifting member (146) fixed for axial movement with said ring gear for selectively axially moving said ring gear to said first and second axial positions thereof, the improvements characterized by: said second positive clutch connection including a positive clutch member (126) rotationally and axially fixed to said first shaft and carrying external clutch teeth (128) thereon for positive engagement with internal clutch teeth (122) rotationally fixed to said ring gear, said external clutch teeth (128) carried by said clutch member define a pitch radius ($R_R$) relative to the axis of rotation of said input shaft equal to the pitch radius defined by the internal clutch teeth of said ring gear for direct engagement therewith when said ring gear is in the second axial position thereof, and further comprising synchronizing means (152 and 156) for synchronizing the rotational speed of said ring gear to the rotational speed of said member and said input shaft, respectively, prior to permitting said ring gear to be moved to said first and second, respectively, axial positions thereof, the synchronizing means (156, 158) for synchronizing said ring gear and sun gear prior to movement of said ring gear to the second axial position thereof comprising a conical surface (158) fixed for rotation with said second shaft.

2. The improved change speed planetary transmission of claim 1 wherein said conical surface (158) is carried by said planet carrier (116).

* * * * *